United States Patent
Elenes

(10) Patent No.: US 11,704,443 B2
(45) Date of Patent: Jul. 18, 2023

(54) BLOCK CIPHER SIDE-CHANNEL ATTACK MITIGATION FOR SECURE DEVICES

(71) Applicant: Silicon Laboratories Inc., Austin, TX (US)

(72) Inventor: Javier Elenes, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 695 days.

(21) Appl. No.: 16/688,009

(22) Filed: Nov. 19, 2019

(65) Prior Publication Data
US 2021/0150069 A1 May 20, 2021

(51) Int. Cl.
| | | |
|---|---|---|
| G06F 21/72 | (2013.01) | |
| G06F 21/75 | (2013.01) | |
| H04L 9/06 | (2006.01) | |
| H04L 9/00 | (2022.01) | |

(52) U.S. Cl.
CPC ............ *G06F 21/72* (2013.01); *G06F 21/755* (2017.08); *H04L 9/0618* (2013.01); *H04L 9/0631* (2013.01); *H04L 9/0637* (2013.01); *H04L 9/003* (2013.01)

(58) Field of Classification Search
CPC ..... H04L 9/003; H04L 9/0631; H04L 9/0637; H04L 9/0618; H04L 9/002; G06F 21/556; G06F 21/72; G06F 21/755; G06F 21/76
See application file for complete search history.

(56) References Cited

U.S. PATENT DOCUMENTS

| | | | |
|---|---|---|---|
| 7,587,044 B2 | 9/2009 | Kocher et al. | |
| 7,634,083 B2 | 12/2009 | Kocher et al. | |
| 8,879,724 B2 | 11/2014 | Kocher et al. | |
| 9,635,011 B1* | 4/2017 | Wu ....................... | H04L 9/3297 |

(Continued)

OTHER PUBLICATIONS

Crypto Stack Exchange, "Can Blocks In AES-CBC Ciphertext be Manipulated In Such a Way That Plaintext Becomes Shuffled?", 3 pgs. (Oct. 2019).

(Continued)

*Primary Examiner* — Jeremy S Duffield
(74) *Attorney, Agent, or Firm* — Egan, Enders & Huston LLP.

(57) ABSTRACT

Systems and methods are disclosed for side-channel attack mitigation for secure devices including cryptographic circuits using block ciphers that are not based upon feedback. For disclosed embodiments, an integrated circuit includes a cryptographic circuit and a controller. The cryptographic circuit performs cryptographic operations in a block cipher AES mode without feedback. The controller outputs control signals to the cryptographic circuit that cause the cryptographic circuit to perform the cryptographic operations on sequential data blocks with an internally permuted order to mitigate block cipher side-channel attacks. The internally permuted order can be generated using one or more random number generators, one or more pre-configured permutated orders, or other techniques. Further, sequential data blocks can be grouped into sequential subsets of data blocks, and the cryptographic operations can be performed in sequence for the subsets with data blocks within each subset being processed with an internally permuted order.

17 Claims, 5 Drawing Sheets

(56) References Cited

U.S. PATENT DOCUMENTS

| | | | | |
|---|---|---|---|---|
| 9,832,022 | B1* | 11/2017 | Pedersen | H04L 9/3247 |
| 10,454,674 | B1* | 10/2019 | Bar-El | H04L 63/123 |
| 2005/0259458 | A1* | 11/2005 | Rustagi | G06F 21/6218 |
| | | | | 365/63 |
| 2010/0124328 | A1* | 5/2010 | Schneider | H04L 9/065 |
| | | | | 380/42 |
| 2012/0027198 | A1* | 2/2012 | He | H04L 9/06 |
| | | | | 380/28 |
| 2013/0136256 | A1* | 5/2013 | Relyea | H04L 9/0637 |
| | | | | 380/28 |
| 2014/0270164 | A1* | 9/2014 | Aggarwal | H04L 9/0816 |
| | | | | 380/46 |
| 2016/0171252 | A1* | 6/2016 | Leiserson | G09C 1/00 |
| | | | | 713/193 |
| 2017/0346628 | A1* | 11/2017 | Lee | H04L 9/0861 |
| 2019/0342070 | A1* | 11/2019 | Deng | G06F 21/6218 |
| 2020/0313923 | A1* | 10/2020 | Choudhary | H04L 12/2825 |

OTHER PUBLICATIONS

Wikipedia, "Advanced Encryption Standard", 12 pgs. (Oct. 2019).
Block Cipher, Encrypting a Large Message, Electronic Code Book, 41 pgs. (2017).
Wikipedia, "Block Cipher Mode of Operation", 13 pgs. (Oct. 2019).

\* cited by examiner

US 11,704,443 B2

BLOCK CIPHER SIDE-CHANNEL ATTACK MITIGATION FOR SECURE DEVICES

TECHNICAL FIELD

The technical field relates to integrated circuits with cryptographic circuit that implement block ciphers for security including wireless internet-of-things (IoT) devices.

BACKGROUND

Integrated circuits (ICs) including ICs that operate as internet-of-things (IoT) devices can perform a variety of functions. For example, an IoT device may have a radio to allow wireless communications. IoT devices may also include sensors, actuators, and/or other circuitry that allow the IoT device to perform one or more functions within the environment within which the IoT devices are deployed. For example, IoT devices can be used to provide a system of autonomous interconnected computing, sensing, and/or actuating devices within an environment such as a home or business. Further, the IoT devices can each have a unique identifier and have the ability to transmit and/or receive data over a network including the IoT devices.

IoT devices face significant privacy and security challenges. To deal with these privacy and security challenges, IoT devices often include cryptographic (crypto) circuits that are integrated on the same IC with other operational circuitry. For example, ICs can include a cryptographic circuit that implements block ciphers to generate cipher text from plaintext or to generate plaintext from ciphertext using one or more secret keys. One common encryption protocol is AES (Advanced Encryption Standard), and AES includes multiple block cipher modes that can be used for cryptographic operations. These block cipher modes include AES-ECB (AES Electronic Codebook Mode), AES-CTR (AES Counter Mode), AES-CBC (AES Cipher Block Chaining Mode) and its variant AES-CCM (AES Cipher Block Chaining-Message Authentication Code Mode), and AES-GCM (AES Galois/Counter Mode). Some of these block ciphers, such as AES-CBC, rely upon feedback from one cipher stage to the next for encryption and decryption operations. Other block modes ciphers, such as AES-ECB and AES-CTR, do not require such feedback.

If the secret keys are compromised, multiple attacks become possible. For example, an attacker can take over control of the device and direct it to act in a way that causes financial, physical, or other harm to people or infrastructures associated with the environment within which the devices are deployed. Further, an attacker with the keys can also impersonate the device within a network to gain access to private or confidential data on the network or stored within other connected devices.

A variety of indirect side-channel techniques have been used by attackers to determine secret keys being used within cryptographic circuits on IoT devices or other secure IC devices. For example, many IoT devices are implemented as system-on-a-chip (SoC) integrated circuits including cryptographic circuits integrated with embedded radios, microcontrollers, and other circuits. Such embedded IC devices are vulnerable to side-channel attacks. Side-channel attacks sidestep the mathematical properties of the cryptographic system by focusing on information gained from the physical operation of the embedded IC device. For example, attackers can extract secret keys from microcontrollers by measuring power consumption or electromagnetic radiation while the device is performing cryptographic operations.

For block cipher side-channel attacks to succeed, the attacker needs to be able to observe either ciphertext or plaintext while measuring side-channel information. For a block cipher such as AES, which processes text in blocks of sixteen (16) bytes, each block of text is associated with a corresponding power measurement by the attacker. This power measurement is also known as a power trace. Once the attacker has collected multiple power traces and corresponding plaintext or ciphertext blocks, where each trace is associated with an observed text block, mathematical techniques can be used to reveal the secret key such as correlation power analysis, template attacks, and machine learning attacks. Using the mathematical techniques and enough power traces, the attacker can determine the secret key and break the encryption being used by the device.

FIG. 1 (Prior Art) is a block diagram of an example embodiment 100 for a prior integrated circuit 102 that can be compromised using a side-channel attack based upon power trace techniques directed to block cipher operations of a cryptographic circuit 106. The integrated circuit 102 also includes a controller 104, memory 108, a radio 116, a ciphertext buffer 110, a plaintext buffer 112, and power supply circuit 118. The radio 116 includes transmit circuits and receive circuits, and the radio 116 is coupled to an antenna 115 and communicates wirelessly with a network. The integrated circuit 102 can also include input/output (IO) pins or connections 114 that allow communications with the controller 104 and/or other circuits within the integrated circuit 102. The cryptographic circuit 106 performs one or more cryptographic operations using one or more secret keys 107 and a block cipher AES mode without feedback. For one embodiment, the secret keys 107 are stored within trusted memory associated with the cryptographic circuit 106. The memory 108 is used to facilitate operations of the integrated circuit 102 and can store data and/or code for the controller 104, the cryptographic circuit 106, and/or other circuit blocks within the integrated circuit 102. Further, buffers 110/112 can be used by the cryptographic circuit 106. These buffers 110/112 can be part of the memory 108 or can be implemented as separate memories, registers, or other data storage mediums within the integrated circuit 102. The power supply circuit 118 receives power from an external voltage supply and provides internal supply voltages to the circuit blocks within the integrated circuit 102. It is also noted that the integrated circuit 102 could also have a network interface circuit instead of or in addition to the radio 116 that provides a wired network connection to a network.

An attacker, as represented by device 120, can compromise the security of the cryptographic circuit 106 by determining the secret keys 107 through side-channel attacks based upon power traces performed during the operation of the cryptographic circuit 106. The attacker device 120 communicates commands to the integrated circuit 102. These commands can be communicated wirelessly through a wireless connection 122 with the antenna 115 and radio 116, through a wired connection 123 with the IO pins or connections 114, through a wired connection with a network interface circuit (if included), and/or through another communication interface for the integrated circuit 102. These commands include crypto-related commands to cause the controller 104 to activate the cryptographic circuit 106 to perform cryptographic operations using one or more of the secret keys 107. The attacker device also has access to either the ciphertext or the plaintext being processed by the cryptographic circuit 106. During the crypto operations, the attacker device 120 performs a power trace of the integrated circuit 102, for example, using one or more probes coupled to pins or circuits for the integrated circuit 102. By performing multiple such power traces and monitoring the ciphertext/plaintext, the attacker device 120 is able to determine crypto information 124 that leaks into the power supply 118. This crypto information 124 is used by the attacker device 120 to determine the secret keys 107.

FIG. 2 (Prior Art) is a block diagram of an example embodiment 200 where ciphertext is converted to plaintext and/or plaintext is converted to ciphertext by cryptographic circuit 106 using AES-CTR mode, and crypto information 124 is leaked during this operation of the cryptographic circuit 106. The cryptographic circuit 106 includes an AES engine 202, a counter (CTR) 204, and secret keys 107. A ciphertext buffer 110 stores encrypted text in multiple sequential data blocks ($C_{11}$, $C_{12}$ . . . $C_{1N}$, $C_{21}$, $C_{22}$ . . . $C_{2N}$ . . . $C_{M1}$, $C_{M2}$ . . . $C_{MN}$) where there are M rows and N columns of data blocks. For one embodiment, each block of data is 16 bytes, and each byte is 8 bits. The ciphertext can be communicated into the buffer 110 and/or out of the buffer 110 (e.g., through the operation of controller 104) as represented by arrows 208 and 209, respectively. A plaintext buffer 112 stores decrypted text in multiple sequential data blocks ($P_{11}$, $P_{12}$ . . . $P_{1N}$, $P_{21}$, $P_{22}$ . . . $P_{2N}$ . . . $P_{M1}$, $P_{M2}$ . . . $P_{MN}$) where there are M rows and N columns of data blocks. For one embodiment, each block of data is 16 bytes, and each byte is 8 bits. The plaintext can be communicated into the buffer 112 and/or out of the buffer 112 (e.g., through the operation of controller 104) as represented by arrows 214 and 215. It is assumed that either the plaintext or the ciphertext is known or can be observed by the attacker device 120 in FIG. 1 (Prior Art).

During crypto operations, ciphertext is decrypted to plaintext, or plaintext is encrypted to ciphertext. For these AES-CTR mode crypto operations, a counter value from counter (CTR) 204 is used along with one or more secret keys 107 to decrypt or encrypt the data blocks. The counter value starts at an initialization vector (IV) 206 that is known by the sender and receiver for the secret communications. The integrated circuit 102 can be the sender and/or receiver for the secret communications. For decryption, the encrypted blocks from ciphertext buffer 110 are provided to the cryptographic circuit 106 in sequential order ($C_{11}$, $C_{12}$ . . . ) as represented by arrow 210, and the cryptographic circuit 106 decrypts the ciphertext blocks into plaintext blocks that are output in sequential order ($P_{11}$, $P_{12}$ . . . ) as represented by arrow 211. The plaintext blocks are then stored in the plaintext buffer 112. For encryption, the un-encrypted blocks from plaintext buffer 112 are provided to the cryptographic circuit 106 in sequential order ($P_{11}$, $P_{12}$ . . . ) as represented by arrow 212, and the cryptographic circuit 106 encrypts the plaintext blocks into ciphertext blocks that are output in sequential order ($C_{11}$, $C_{12}$ . . . ) as represented by arrow 213. The ciphertext blocks are then stored in the ciphertext buffer 110.

As described above, crypto information 124 from the operation of the cryptographic circuit 106 leaks into the supply voltages, and the attacker device 120 in FIG. 1 (Prior Art) can perform power traces to detect this crypto information 124. Where the attacker device 120 has access to the ciphertext or the plaintext, which is assumed for FIG. 2 (Prior Art), the attacker device 120 can use the power traces to determine the secret keys 107 being used by the cryptographic circuit 106. Prior solutions have attempted to address this problem by adding random noise to power supply that are externally accessible and randomizing data communicated through external data paths with masks known by communicating devices. These external randomizing techniques, however, add complexity and costs to solutions.

SUMMARY OF THE INVENTION

Systems and methods are disclosed for block cipher side-channel attack mitigation for secure devices using block cipher AES modes that are not based upon feedback. For disclosed embodiments, an integrated circuit includes a cryptographic circuit and a controller. The cryptographic circuit performs cryptographic operations in a block cipher AES mode without feedback. The controller outputs control signals to the cryptographic circuit that cause the cryptographic circuit to perform the cryptographic operations on sequential data blocks with an internally permuted order to mitigate block cipher side-channel attacks. The internally permuted order can be generated using one or more random number generators, one or more pre-configured permutated orders, or other techniques. Further, sequential data blocks can be grouped into sequential subsets of data blocks, and the cryptographic operations can be performed in sequence for the subsets with data blocks within each subset being processed with an internally permuted order. Other features and variations can also be implemented, and related systems and methods can be utilized as well.

For one embodiment, an integrated circuit having block cipher side-channel attack mitigation is disclosed including a cryptographic circuit and a controller. The cryptographic circuit is configured to perform cryptographic operations in a block cipher advanced encryption standard (AES) mode without feedback. The controller outputs control signals to the cryptographic circuit, and the control signals cause the cryptographic circuit to perform the cryptographic operations on sequential data blocks with an internally permuted order to mitigate block cipher side-channel attacks. In further embodiments, the block cipher AES mode is an AES counter (CTR) mode or an AES electronic codebook (ECB) mode.

In additional embodiments, the internally permuted order is an order generated using one or more random number generators. In further additional embodiments, the internally permuted order is one or more pre-configured permutated orders.

In additional embodiments, sequential data blocks are grouped into a plurality of sequential subsets of data blocks. In further embodiments, the control signals cause the cryptographic circuit to perform the cryptographic operations in sequence for the sequential subsets of data blocks with data blocks within each subset having an internally permuted order.

In additional embodiments, the integrated circuit also includes a first buffer configured to store ciphertext data blocks having a sequential order and a second buffer configured to store plaintext data blocks having a sequential order. In further embodiments, the cryptographic circuit is configured to perform at least one of a decryption of the ciphertext blocks to generate the plaintext data blocks or an encryption of the plaintext blocks to generate the ciphertext data blocks. In still further embodiments, at least one of the plaintext data blocks or the ciphertext data blocks are input to or output from the integrated circuit.

In additional embodiments, the integrated circuit also includes at least one of a radio or a network interface circuit configured to communicate with a network.

For one embodiment, an internet-of-things (IoT) device is disclosed including a radio coupled to an antenna to communicate with a network, a first buffer configured to store ciphertext data blocks having a sequential order, a second buffer configured to store plaintext data blocks having a sequential order, a cryptographic circuit, and a controller. The cryptographic circuit is configured to perform cryptographic operations in a block cipher advanced encryption standard (AES) mode without feedback on at least one of the ciphertext data blocks or the plaintext data blocks. The controller outputs control signals to the cryptographic circuit, and the control signals cause the cryptographic circuit to perform the cryptographic operations on sequential data blocks with an internally permuted order to mitigate block cipher side-channel attacks. The radio, the first buffer, the second buffer, the cryptographic circuit, and the controller are integrated within an integrated circuit; and at least one of the plaintext data blocks or the ciphertext data blocks are input to or output from the integrated circuit. In further embodiments, the block cipher AES mode is an AES counter (CTR) mode or an AES electronic codebook (ECB) mode.

In additional embodiments, sequential data blocks are grouped into a plurality of sequential subsets of data blocks. In further embodiments, the control signals cause the cryptographic circuit to perform the cryptographic operations in sequence for the sequential subsets of data blocks with data blocks within each subset having an internally permuted order.

For one embodiment, a method to mitigate block cipher side-channel attacks is disclosed including performing, within an integrated circuit, cryptographic operations on sequential data blocks using a block cipher advanced encryption standard (AES) mode without feedback. The cryptographic operations are performed on the sequential data blocks with an internally permuted order to mitigate block cipher side-channel attacks. In further embodiments, the block cipher AES mode is an AES counter (CTR) mode or an AES electronic codebook (ECB) mode.

In additional embodiments, the method also includes generating the internally permuted order using one or more random number generators or by applying one or more pre-configured permutated orders.

In additional embodiments, the sequential data blocks are grouped into a plurality of sequential subsets of data blocks; the cryptographic operations are performed in sequence for the sequential subsets of data blocks; and the data blocks within each subset are processed with an internally permuted order.

In additional embodiments, the method also includes storing ciphertext data blocks having a sequential order in a first buffer within the integrated circuit and storing plaintext data blocks having a sequential order in a second buffer within the integrated circuit. In further embodiments, the method also includes inputting at least one of the plaintext data blocks or the ciphertext data blocks to the integrated circuit or outputting at least one of the plaintext data blocks or the ciphertext data blocks from the integrated circuit.

Other features and variations can also be implemented, and related systems and methods can be utilized as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Systems and methods are disclosed for side-channel attack mitigation for secure devices that use block ciphers. As described herein, disclosed embodiments include cryptographic circuits that apply a secret, permuted block order to process sequential data blocks of plaintext and/or ciphertext using block cipher modes. The data blocks can be permuted using randomly generated numbers, permutated block orders, and/or other techniques performed internally within an integrated circuit so that their order is unobservable by an attacking device. The resulting plaintext or ciphertext blocks are then re-ordered into their original sequence before being output through any external communication interface for the integrated circuit. Therefore, the observed power traces do not match the order of the observable plaintext or ciphertext data blocks. As such, the attacker is not able to associate a power trace with a specific block of plaintext or ciphertext, and an integrated circuit using the disclosed block cipher attack mitigation techniques is not subject to attacks such as correlation power analysis, template attacks, known machine learning attacks, and/or other similar power trace techniques. Various features can be implemented for the embodiments described herein, and related systems and methods can be utilized as well.

Figure 3:
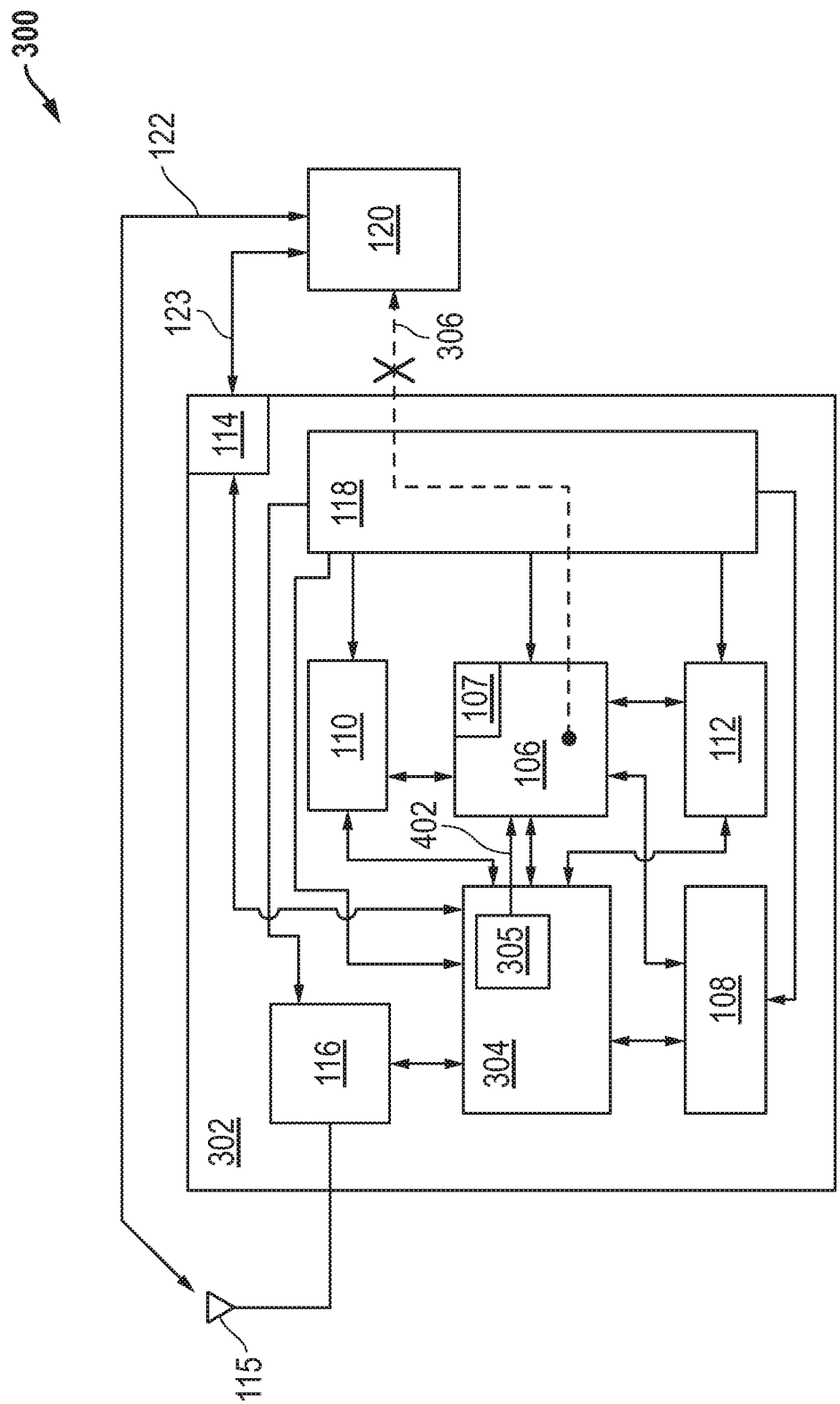
FIG. 3 is a block diagram of an example embodiment for an integrated circuit that inhibits or eliminates side-channel attacks based upon power trace directed to block cipher operations of a cryptographic circuit by permuting the order that plaintext/ciphertext data blocks are processed.

FIG. 3 is a block diagram of an example embodiment 300 for an integrated circuit 302 according to the disclosed embodiments that inhibits or eliminates side-channel attacks based upon power traces directed to block cipher operations of a cryptographic circuit 106. The integrated circuit 302 also includes a controller 304, memory 108, a radio 116, a ciphertext buffer 110, a plaintext buffer 112, and power supply circuit 118. The radio 116 includes transmit circuits and receive circuits, and the radio 116 is coupled to an antenna 115 and communicates wirelessly with a network. The integrated circuit 302 can also include input/output (IO) pins or connections 114 that allow communications with the controller 304 and/or other circuits within the integrated circuit 302. The cryptographic circuit 106 performs one or more cryptographic operations using one or more secret keys 107 and a block cipher AES mode without feedback. For one embodiment, the secret keys 107 are stored within trusted memory associated with the cryptographic circuit 106. The memory 108 is used to facilitate operations of the integrated circuit 302 and can store data and/or code for the controller 304, the cryptographic circuit 106, and/or other circuit blocks within the integrated circuit 302. Further, buffers 110/112 can be used by the cryptographic circuit 106. These buffers 110/112 can be part of the memory 108 or can be implemented as separate memories, registers, or other data storage mediums within the integrated circuit 302. The power supply circuit 118 receives power from an external voltage supply and provides internal supply voltages to the circuit blocks within the integrated circuit 302. It is also noted that the integrated circuit 302 could also have a network interface circuit instead of or in addition to the radio 116 that provides a wired network connection to a network.

Figure 1:
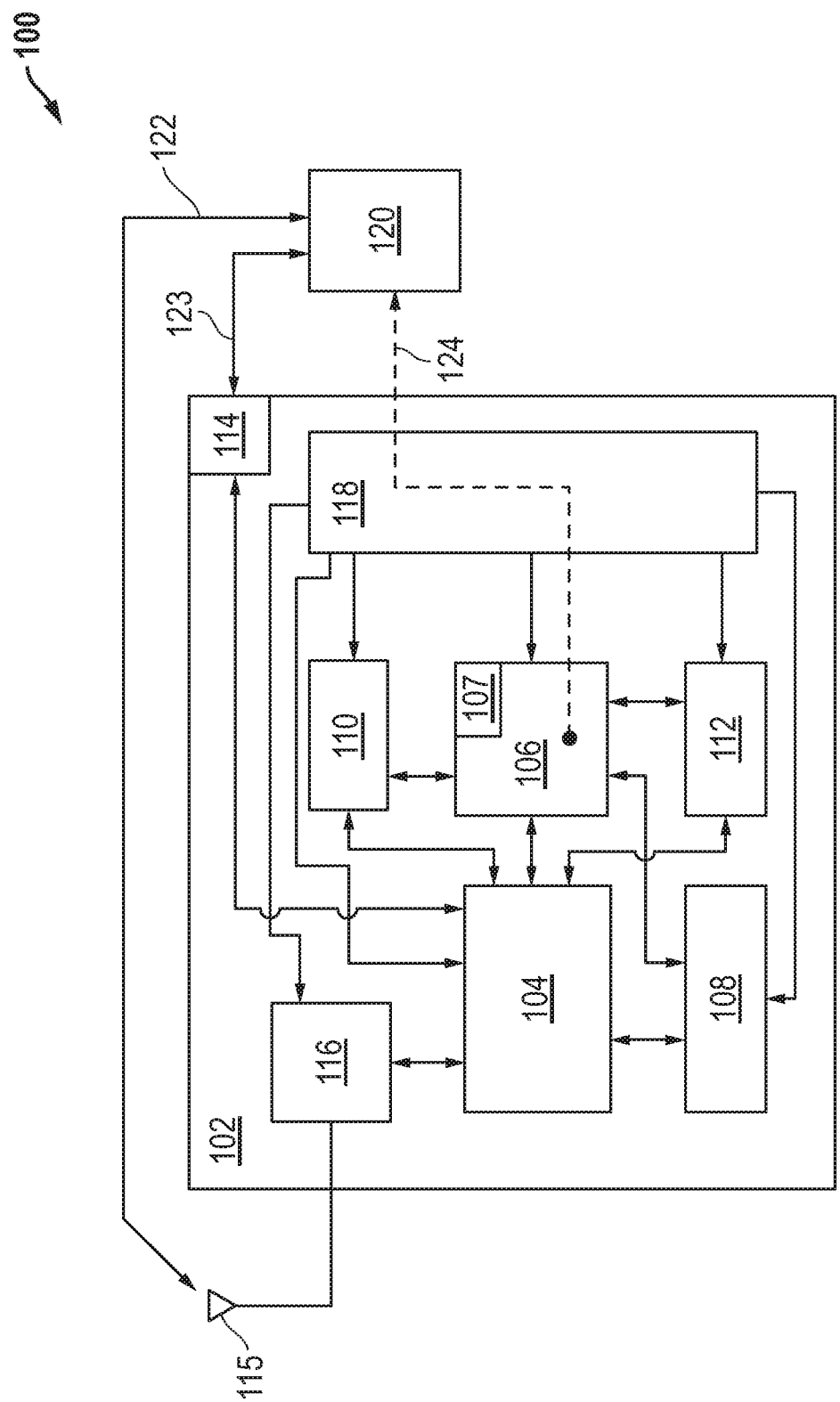
FIG. 1 (Prior Art) is a block diagram of an example embodiment where an attacking device compromises the security of cryptographic circuit through a block cipher side-channel attack based upon access to ciphertext or plaintext and multiple power traces.

In contrast with the integrated circuit 102 in FIG. 1 (Prior Art), the controller 304 includes a permuter 305 that outputs one or more control signals 402 to cause the blocks within buffers 110/112 to be processed by the cryptographic circuit 106 in permuted order so that the data blocks are not processed in sequence for the plaintext blocks and/or ciphertext blocks. As described further herein, this internally permuted order used by the cryptographic circuit 106 inhibits or prevents side-channel attacks directed to the crypto processing of block ciphers. The permuter 305 can be implemented as part of the controller 304 or can be a separate logic circuit within the integrated circuit 302 configured and/or programmed to carry out the permuting functions described herein. The permuter 305 and/or the controller 304 can be implemented, for example, as a hardware, software, or a combination of hardware and software embedded within integrated circuit 302 to carry out the disclosed functions. Further, the permuter 305 can implement one or more random number generators to generate an internally permuted order for the cipher blocks. The permuter 305 can also be configured to implement one or more pre-configured permuted orders to generate the internally permuted order. Each permuted order represents one non-sequential re-ordering of the sequential data blocks. For such an implementation, the one or more pre-configured permuted orders are stored or coded into the permuter 305 and are then used to determine the order of the blocks processed by the cryptographic circuit 106.

As described above with respect to FIG. 1 (Prior Art), to perform a block cipher side-channel attack, the attacker device 120 attempts to compromise the security of the cryptographic circuit 106 by determining the secret keys 107 through side-channel attacks based upon power traces performed during the block cipher operations of the cryptographic circuit 106. The attacking device 120 communicates commands to the integrated circuit 302. These commands can be communicated wirelessly through a wireless connection 122 with the antenna 115 and radio 116, through a wired connection 123 with the IO pins or connections 114, through a wired connection with a network interface circuit (if included), and/or through another communication interface for the integrated circuit 302. These commands include crypto-related commands or triggers to cause the controller 104 to activate the cryptographic circuit 106 to perform cryptographic operations using one or more of the secret keys 107. The attacker device also has access to either the ciphertext or the plaintext being processed by the cryptographic circuit 106. During the crypto operations, the attacker device 120 performs a power trace of the integrated circuit 302, for example, using one or more probes coupled to pins or circuits for the integrated circuit 302. However, because the plaintext and/or ciphertext blocks are processed in an internally permuted order through the operation of permuter 305, power traces performed by the attacker device 120 cannot be matched with the plaintext or ciphertext blocks being processed by the cryptographic circuit 106. While the crypto information may still be leaked into the power supply as indicated by dashed arrow 306, this crypto information will not match the observable plaintext or ciphertext and therefore cannot be used by the attacker device 120 to determine the secret keys 107.

Figure 4:
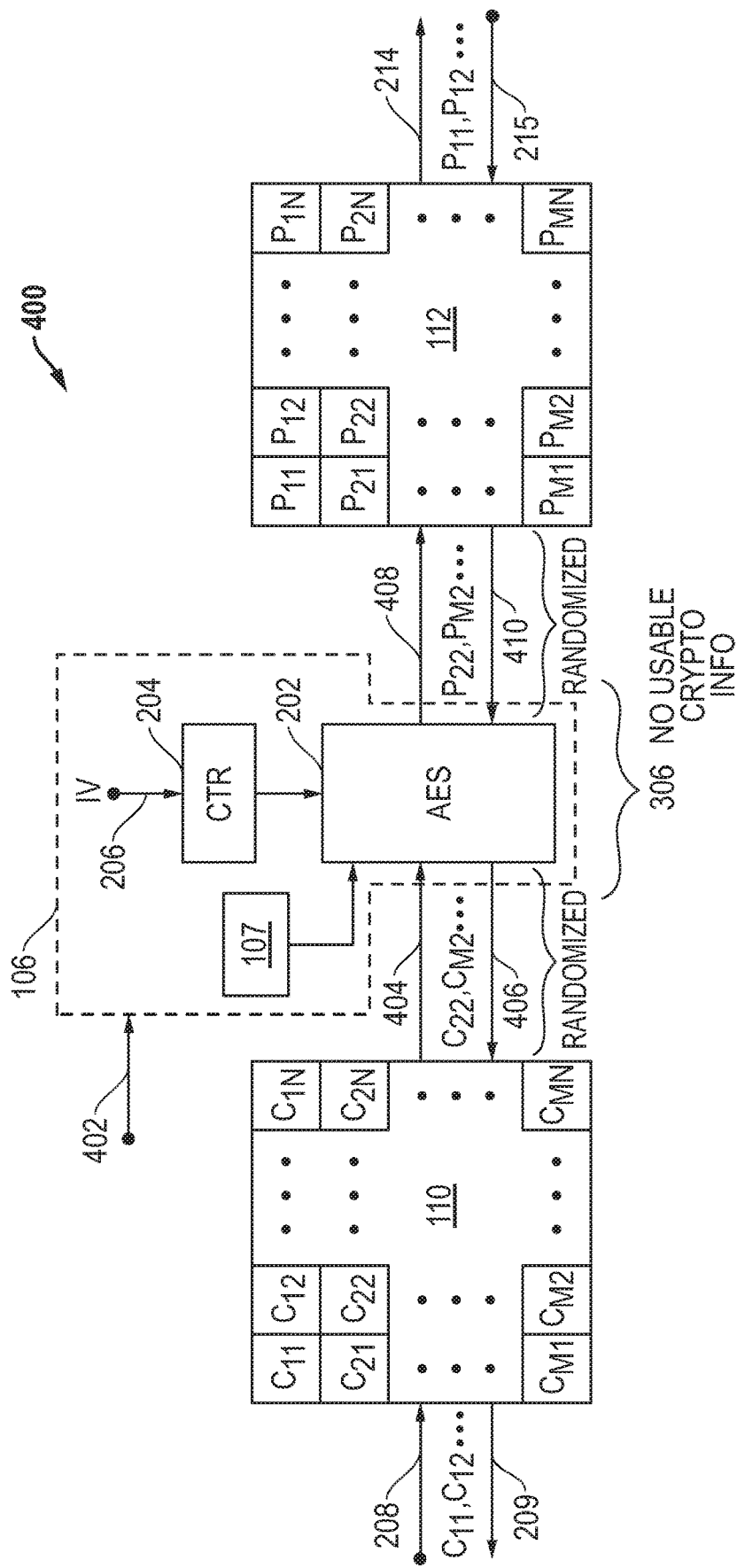
FIG. 4 is a block diagram of an example embodiment where ciphertext is converted to plaintext and/or plaintext is converted to ciphertext by cryptographic circuit using AES-CTR mode, and no usable crypto information is leaked during this block cipher operation of the cryptographic circuit due to an internally permuted order for plaintext/ciphertext data blocks.

FIG. 4 is a block diagram of an example embodiment 400 where ciphertext is converted to plaintext and/or plaintext is converted to ciphertext by cryptographic circuit 106 using AES-CTR mode, and no usable crypto information 306 is leaked during this operation of the cryptographic circuit 106. The cryptographic circuit 106 includes an AES engine 202, a counter (CTR) 204, and secret keys 107. A ciphertext buffer 110 stores encrypted text in multiple sequential data blocks ($C_{11}$, $C_{12}$ ... $C_{1N}$, $C_{21}$, $C_{22}$ ... $C_{2N}$ ... $C_{M1}$, $C_{M2}$ ... $C_{MN}$) where there are M rows and N columns of data blocks. For one embodiment, each block of data is 16 bytes, and each byte is 8 bits. The ciphertext can be communicated into the buffer 110 and/or out of the buffer 110 (e.g., through the operation of controller 104) as represented by arrows 208 and 209, respectively. A plaintext buffer 112 stores decrypted text in multiple sequential data blocks ($P_{11}$, $P_{12}$ ... $P_{1N}$, $P_{21}$, $P_{22}$ ... $P_{2N}$ ... $P_{M1}$, $P_{M2}$ ... $P_{MN}$) where there are M rows and N columns of data blocks. For one embodiment, each block of data is 16 bytes, and each byte is 8 bits. The plaintext can be communicated into the buffer 112 and/or out of the buffer 112 (e.g., through the operation of controller 104) as represented by arrows 214 and 215. It is assumed that either the plaintext or the ciphertext is known or can be observed by the attacker device 120 in FIG. 3.

Figure 2:
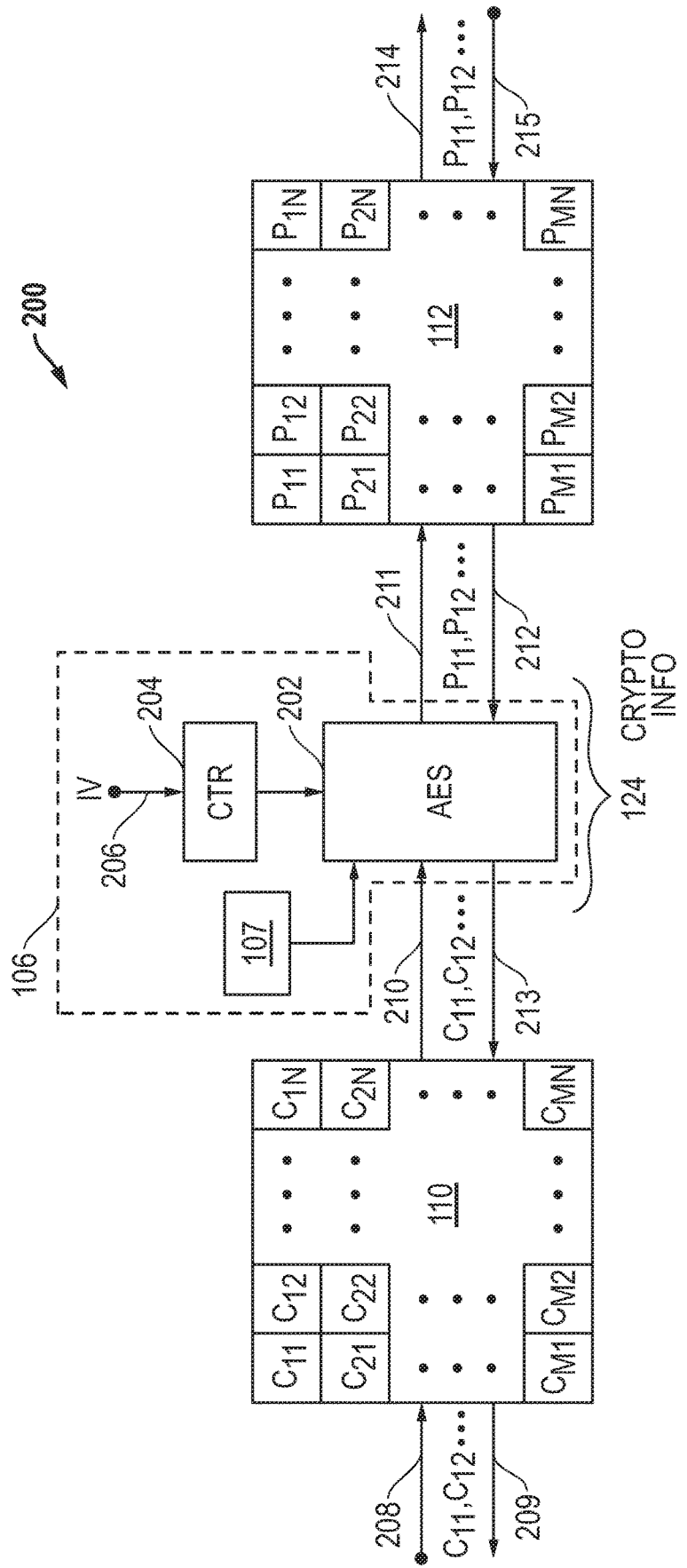
FIG. 2 (Prior Art) is a process diagram of an example embodiment where ciphertext is converted to plaintext and/or plaintext is converted to ciphertext by a cryptographic circuit using AES-CTR mode, and crypto information is leaked during this block cipher operation of the cryptographic circuit.

As with embodiment 200 in FIG. 2 (Prior Art), crypto operations are used to decrypt ciphertext into plaintext or to encrypt plaintext into ciphertext. For these AES-CTR mode crypto operations, a counter value from counter (CTR) 204 is used along with one or more secret keys 107 to decrypt or encrypt the data blocks. The counter value starts at an initialization vector (IV) 206 that is known by the sender and receiver for the secret communications. The integrated circuit 302 can be the sender and/or receiver for the secret communications.

In contrast with embodiment 200 of FIG. 2 (Prior Art), one or more control signals 402 from the permuter 305 cause the internal block order to be internally permuted for the cryptographic operations performed by the cryptographic circuit 106. For decryption, the encrypted blocks from ciphertext buffer 110 are provided to the cryptographic circuit 106 in an internally permuted order ($C_{22}$, $C_{M2}$ ... ) as represented by arrow 404, and the cryptographic circuit 106 decrypts the ciphertext blocks into plaintext blocks that are output in this internally permuted order ($P_{22}$, $P_{M2}$ ... ) as represented by arrow 408. The plaintext blocks are then re-ordered into the original sequential order when stored in the plaintext buffer 112. For encryption, the un-encrypted blocks from plaintext buffer 112 are provided to the cryptographic circuit 106 in an internally permuted order ($P_{22}$, $P_{M2}$ ... ) as represented by arrow 410, and the cryptographic circuit 106 encrypts the plaintext blocks into ciphertext blocks that are output in this internally permuted order ($C_{22}$, $C_{M2}$ ... ) as represented by arrow 406. The ciphertext blocks are then re-ordered into the original sequential order when stored in the ciphertext buffer 110.

While crypto information 306 from the operation of the cryptographic circuits 106 may still leak into the supply voltages, this crypto information 306 will not be usable by the attacker device 120 to determine the secret keys 107 from power traces performed during operation of the cryptographic circuit 106. Even if the attacker device 120 has access to the ciphertext or the plaintext, which is assumed for FIG. 4, the attacker device 120 will not be able to match the power traces to the data blocks processed by the cryptographic circuit 106 due to the internally permuted order. As such, the disclosed embodiments inhibit or prevent side-channel attacks based upon power traces directed to block cipher cryptographic operations.

It is noted that the internally permuted order applied by control signals 402 can also be used to process subsets of data blocks. For example, where there are M×N data blocks as shown in embodiment 400, Z different subsets of data blocks can be grouped and processed by the cryptographic circuit 106 with each subset of blocks including M×N/Z blocks. Further, the subsets can be processed in sequential order while the blocks with each subset are permuted by permuter 305. This subset technique can be used, for example, where a process being run by the controller 304 needs access to decrypted ciphertext faster than would be possible if it waited for all of the data blocks within buffer 110 to be decrypted by the cryptographic circuit 106. For this subset techniques, the ciphertext in buffer 110 can be grouped into Z subsets ($S_1, S_2, \ldots S_Z$), and these subsets can be processed in sequence. When each subset is processed, however, the M×N/Z blocks within that subset have their order internally permuted by the control signals 402. Further, one or more permuted orders can be applied by the permuter 305 to different subsets. As described above, the internally permuted orders can be generated using random number generators performed by the controller 304, using pre-configured permutated orders applied by controller 304, and/or using other techniques or combinations of techniques. As such, even though the subsets are processed in sequential order, the blocks within each subset are processed in an internally permuted order. Side-channel attacks based upon block cipher cryptographic operations are thereby inhibited or prevented.

It is further noted that the disclosed embodiments are useful for block cipher techniques where feedback is not used from one crypto cycle to the next. For example, the techniques described herein are useful for AES-CTR mode and AES-ECB mode where feedback is not used for block cipher cryptographic operations. In contrast, the internal block permuting techniques described herein are not useful for AES-ECB mode where the result of one crypto cycle is used as feedback for the next crypto cycle. For such an AES-ECB mode, the internal permuting provided by permuter 305 will cause blocks to be processed non-sequentially such that crypto result for block-to-block feedback techniques will no longer be viable.

Figure 5:
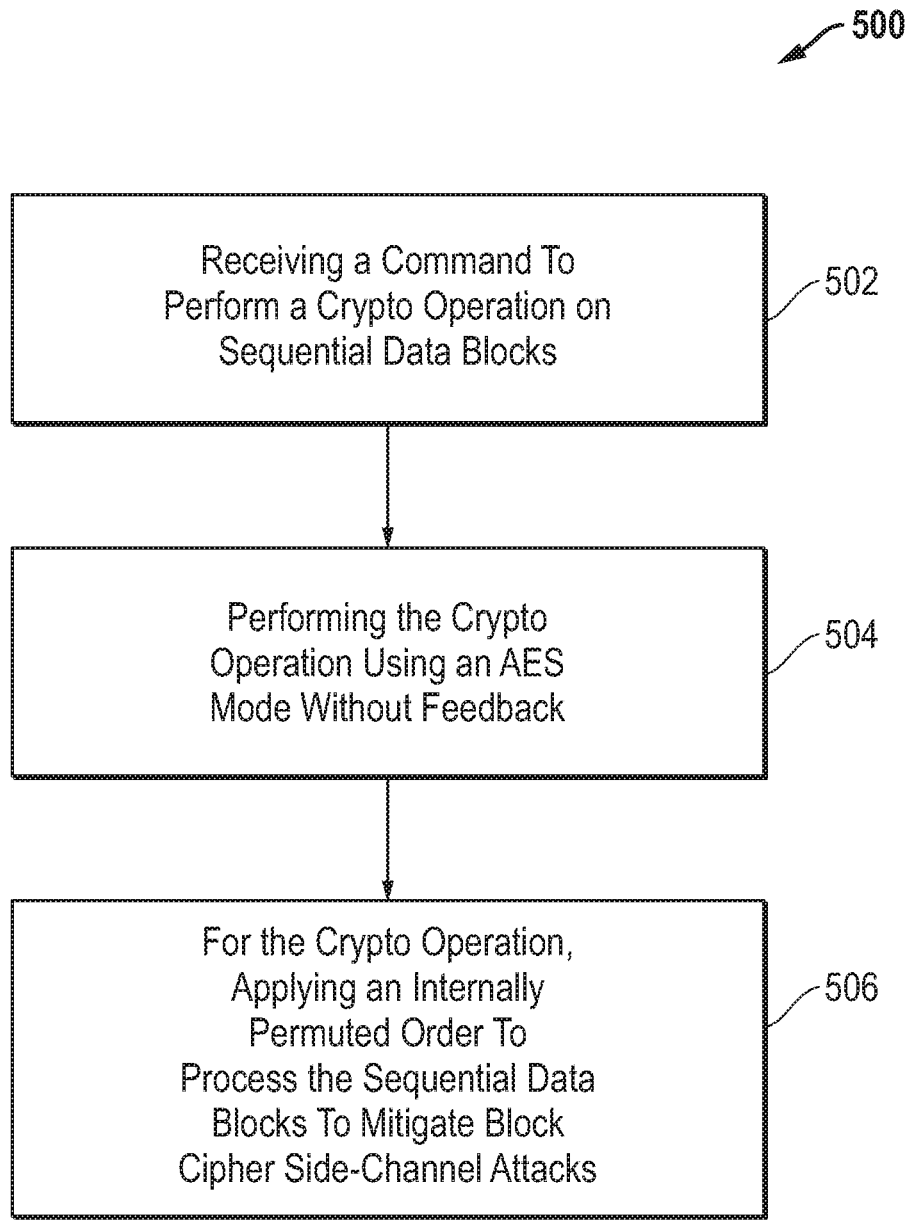
FIG. 5 is a process diagram of an example embodiment where a cryptographic circuit processes input blocks in a secret, permuted order to inhibit or eliminate side-channel attacks based upon power traces directed to block cipher operations of a cryptographic circuit.

FIG. 5 is a process diagram of an example embodiment 500 where an internally permuted order is applied to data blocks processed by a cryptographic circuit 106 to inhibit or eliminate side-channel attacks based upon power traces directed to block cipher operations of a cryptographic circuit 106. In block 502, a command is received by the integrated circuit 302 to perform a cryptographic operation on sequential data blocks, such as ciphertext data blocks stored in buffer 110 or plaintext data blocks stored in buffer 112. In block 504, the cryptographic operation is performed on the sequential blocks by the cryptographic circuit 106 using an AES mode without feedback. For one embodiment, the block cipher AES mode is an AES counter (CTR) mode or an AES electronic codebook (ECB) mode. In block 506, an internally permuted order is applied to the sequential data blocks for the cryptographic operations to mitigate block cipher side-channel attacks. Different and/or additional process steps can also be applied while still taking advantage of the block cipher side-channel attack mitigation techniques described herein.

It is noted that the functional blocks, devices, and/or circuitry described herein can be implemented using hardware, software, or a combination of hardware and software. For one embodiment, one or more programmable integrated circuits are programmed to provide the functionality described herein. For example, one or more processors (e.g., microprocessor, microcontroller, central processing unit, etc.), programmable logic devices (e.g., complex programmable logic device (CPLD)), field programmable gate array (FPGA), etc.), and/or other programmable integrated circuits can be programmed with software or other programming instructions to implement the functionality of a proscribed plasma process recipe. It is further noted that the software or other programming instructions can be stored in one or more non-transitory computer-readable mediums (e.g., memory storage devices, FLASH memory, DRAM memory, reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein. Other variations could also be implemented.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An integrated circuit having block cipher side-channel attack mitigation, the integrated circuit being an internet-of-things (IoT) device, the integrated circuit comprising:
   a first buffer configured to store sequential data blocks, wherein the sequential data blocks stored within the first buffer comprise ciphertext data blocks stored in a sequential order;
   a second buffer configured to store sequential data blocks, wherein the sequential data blocks stored within the second buffer comprise plaintext data blocks stored in the sequential order;
   a cryptographic circuit configured to perform cryptographic operations in a block cipher advanced encryption standard (AES) mode without feedback; and
   a controller having control signals as outputs to the cryptographic circuit, wherein the control signals output to the cryptographic circuit permute an internal block order of the cryptographic circuit to an internally permuted order, and wherein the cryptographic circuit performs the cryptographic operations on the sequential data blocks stored within the first buffer and the second buffer in the internally permuted order to mitigate block cipher side-channel attacks;
at least one of a radio or a network interface circuit configured to communicate with a network;
wherein during decryption operations, the cryptographic circuit is configured to receive the ciphertext data blocks from the first buffer in the internally permuted order, decrypt the received ciphertext data blocks into plaintext data blocks in the internally permuted order, and output the plaintext data blocks to the second buffer in the internally permuted order to further mitigate block cipher side-channel attacks; and
wherein the plaintext data blocks output to the second buffer are re-ordered into the sequential order when stored within the second buffer; and
wherein during encryption operations, the cryptographic circuit is configured to receive the plaintext data blocks from the second buffer in the internally permuted order, encrypt the received plaintext data blocks into ciphertext data blocks in the internally permuted order, and output the ciphertext data blocks to the first buffer in the internally permuted order.

2. The integrated circuit of claim 1, wherein the block cipher AES mode comprises an AES counter (CTR) mode or an AES electronic codebook (ECB) mode.

3. The integrated circuit of claim 1, wherein the internally permuted order comprises an order generated using one or more random number generators.

4. The integrated circuit of claim 1, wherein the internally permuted order comprises one or more pre-configured permutated orders.

5. The integrated circuit of claim 1, wherein sequential data blocks are grouped into a plurality of sequential subsets of data blocks.

6. The integrated circuit of claim 5, wherein the control signals cause the cryptographic circuit to perform the cryptographic operations in sequence for the sequential subsets of data blocks with data blocks within each subset having the internally permuted order.

7. The integrated circuit of claim 1, wherein the ciphertext data blocks output to the first buffer are re-ordered into the sequential order when stored within the first buffer.

8. The integrated circuit of claim 1, wherein at least one of the plaintext data blocks or the ciphertext data blocks are input to or output from the integrated circuit.

9. An internet-of-things (IoT) device, comprising:
a radio coupled to an antenna to communicate with a network;
a first buffer configured to store sequential data blocks, wherein the sequential data blocks stored within the first buffer comprise ciphertext data blocks having a sequential order;
a second buffer configured to store sequential data blocks, wherein the sequential data blocks stored within the second buffer comprise plaintext data blocks having the sequential order;
a cryptographic circuit configured to perform cryptographic operations in a block cipher advanced encryption standard (AES) mode without feedback; and
a controller having control signals as outputs to the cryptographic circuit, wherein the control signals output to the cryptographic circuit change an internal block order of the cryptographic circuit to an internally permuted order, and wherein the cryptographic circuit performs the cryptographic operations on the sequential data blocks stored within at least one of the first buffer and the second buffer with the internally permuted order to mitigate block cipher side-channel attacks;
wherein the radio, the first buffer, the second buffer, the cryptographic circuit, and the controller are integrated within an integrated circuit;
wherein during decryption operations, the cryptographic circuit receives the ciphertext data blocks from the first buffer in the internally permuted order, decrypts the received ciphertext data blocks into plaintext data blocks in the internally permuted order, and outputs the plaintext data blocks to the second buffer in the internally permuted order to further mitigate block cipher side-channel attacks;
wherein during encryption operations, the cryptographic circuit receives the plaintext data blocks from the second buffer in the internally permuted order, encrypts the received plaintext data blocks into ciphertext data blocks in the internally permuted order, and outputs the ciphertext data blocks to the first buffer in the internally permuted order to further mitigate block cipher side-channel attacks; and
wherein at least one of the plaintext data blocks or the ciphertext data blocks are input to or output from the integrated circuit in the sequential order.

10. The IoT device of claim 9, wherein the block cipher AES mode comprises an AES counter (CTR) mode or an AES electronic codebook (ECB) mode.

11. The IoT device of claim 9, wherein the sequential data blocks are grouped into a plurality of sequential subsets of data blocks.

12. The IoT device of claim 11, wherein the control signals cause the cryptographic circuit to perform the cryptographic operations in sequence for the sequential subsets of data blocks with data blocks within each subset having the internally permuted order.

13. A method to mitigate block cipher side-channel attacks in an Internet of Things (IOT) device, comprising:
storing sequential data blocks within a first buffer included within an integrated circuit, wherein the sequential data blocks stored within the first buffer comprise ciphertext data blocks stored in a sequential order;
storing sequential data blocks within a second buffer included within the integrated circuit, wherein the sequential data blocks stored within the second buffer comprise plaintext data blocks stored in the sequential order;
changing an internal block order of a cryptographic circuit included within the integrated circuit to an internally permuted order in response to receiving, by the cryptographic circuit, a control signal from a controller included within the integrated circuit;
performing cryptographic operations on the sequential data blocks stored within the first buffer and the second buffer using a block cipher advanced encryption standard (AES) mode without feedback to generate processed data blocks, wherein the cryptographic operations are performed by the cryptographic circuit in the internally permuted order;
wherein during decryption operations, the cryptographic circuit is configured to receive the ciphertext data blocks from the first buffer in the internally permuted order, decrypt the received ciphertext data blocks into plaintext data blocks in the internally permuted order, and output the plaintext data blocks to the second buffer in the internally permuted order to further mitigate block cipher side-channel attacks, wherein the plaintext data blocks output to the second buffer are re-ordered into the sequential order when stored within the second buffer;

wherein during encryption operations, the cryptographic circuit is configured to receive the plaintext data blocks from the second buffer in the internally permuted order, encrypt the received plaintext data blocks into ciphertext data blocks in the internally permuted order, and output the ciphertext data blocks to the first buffer in the internally permuted order; and providing, within the integrated circuit, at least one of a radio or a network interface circuit configured to communicate with a network.

14. The method of claim 13, wherein the block cipher AES mode comprises an AES counter (CTR) mode or an AES electronic codebook (ECB) mode.

15. The method of claim 13, further comprising generating the internally permuted order using one or more random number generators or by applying one or more pre-configured permutated orders.

16. The method of claim 13, wherein the sequential data blocks are grouped into a plurality of sequential subsets of data blocks, wherein the cryptographic operations are performed in sequence for the sequential subsets of data blocks, and wherein data blocks within each subset are processed with the internally permuted order.

17. The method of claim 13, further comprising inputting at least one of the plaintext data blocks or the ciphertext data blocks to the integrated circuit, or outputting at least one of the plaintext data blocks or the ciphertext data blocks from the integrated circuit, in the sequential order.

* * * * *